US006984061B1

United States Patent
Soderberg et al.

(10) Patent No.: US 6,984,061 B1
(45) Date of Patent: Jan. 10, 2006

(54) COVERT INFRARED LANDING LIGHT

(75) Inventors: Bruce W. Soderberg, Walnut, CA (US); Albert C. Knudsen, La Habra, CA (US); William T. Ryczek, Claremont, CA (US); Stephen F. Mandap, Chino Hills, CA (US); Brandon Weiss, Upland, CA (US); Timothy R. Irsik, Chino, CA (US)

(73) Assignee: Soderberg Manufacturing Co., Inc., Walnut, CA (US)

( * ) Notice: Subject to any disclaimer, the term of this patent is extended or adjusted under 35 U.S.C. 154(b) by 20 days.

(21) Appl. No.: 10/793,969

(22) Filed: Mar. 5, 2004

Related U.S. Application Data

(60) Provisional application No. 60/452,290, filed on Mar. 5, 2003.

(51) Int. Cl.
*B64D 47/02* (2006.01)

(52) U.S. Cl. .................. 362/470; 362/259; 362/290; 362/325; 362/342; 362/354

(58) Field of Classification Search ............. 362/470, 362/259, 290, 291, 293, 325, 342, 354
See application file for complete search history.

(56) References Cited

U.S. PATENT DOCUMENTS

| 4,707,696 | A |  | 11/1987 | Task et al. |
| 5,077,649 | A |  | 12/1991 | Jackel et al. |
| 5,486,989 | A | * | 1/1996 | Compton ................. 362/291 |
| 5,929,954 | A | * | 7/1999 | Omae et al. .............. 349/95 |
| 5,984,494 | A |  | 11/1999 | Chapman et al. |
| 6,439,752 | B1 |  | 8/2002 | Petrick |
| 6,533,441 | B2 |  | 3/2003 | Kisiel |
| 6,559,777 | B1 |  | 5/2003 | Martin et al. |
| 6,567,248 | B1 |  | 5/2003 | Schmidt et al. |
| 6,609,812 | B2 | * | 8/2003 | Machi et al. ............. 362/231 |
| 2001/0050344 | A1 |  | 12/2001 | Albou |
| 2002/0074523 | A1 |  | 6/2002 | Machi et al. |
| 2002/0075679 | A1 |  | 6/2002 | Machi et al. |
| 2003/0076688 | A1 |  | 4/2003 | Kobayashi |
| 2003/0086251 | A1 |  | 5/2003 | Hamilton |

FOREIGN PATENT DOCUMENTS

GB 172081 11/1921
WO WO 02/49915 A1 6/2002

* cited by examiner

*Primary Examiner*—John Anthony Ward
*Assistant Examiner*—Mark Tsidulko
(74) *Attorney, Agent, or Firm*—Eric Karich

(57) ABSTRACT

An infrared landing light is disclosed including a housing adapted for mounting in an aircraft, a lamp positioned within the housing and adapted to produce light having an infrared portion, and a louver positioned within the housing and adapted to receive the light and to substantially absorb a fraction of the light not directed in a forward direction.

11 Claims, 6 Drawing Sheets

US 6,984,061 B1

COVERT INFRARED LANDING LIGHT

CROSS-REFERENCE TO RELATED APPLICATIONS

This application for a utility patent claims the benefit of U.S. Provisional Application No. 60/452,290, filed Mar. 5, 2003. This application is incorporated herein by reference in its entirety.

STATEMENT REGARDING FEDERALLY SPONSORED RESEARCH

Not Applicable

BACKGROUND OF THE INVENTION

1. Field of the Invention

This invention relates generally to landing lights for aircraft, and more particularly to a covert landing light that provides illumination to aid pilots during takeoffs and landings without betraying the location of the aircraft.

2. Description of Related Art

Aircraft such as airplanes generally have landing lights mounted thereon for providing illumination to aid pilots during takeoffs and landings at night or when visibility is otherwise reduced. In a standard aircraft, these landing lights are typically provided by incandescent parabolic aluminized reflector (PAR) lamps that are plainly visible to anyone within sight of the aircraft. An example of this structure is shown in Petrick, U.S. Pat. No. 6,439,752 B1, hereby incorporated by reference in its entirety.

Such lamps are not suitable, however, to military aircraft that are operating in potentially hostile territory, because the lamps illuminate the aircraft and make it an easy target for attack. There is therefore a need for a covert landing lamp that assists the pilot of the aircraft with takeoffs and landings without betraying the location of the aircraft to potential enemies.

Prior art covert landing lights utilize infrared landing lights that cannot be seen by the human eye without external viewing aids such as night vision devices (e.g., night vision goggles). Infrared landing lights have been installed on military aircraft, and pilots aided by night vision devices are able to perform covert aircraft landings and takeoffs at night using infrared landing lights.

Known infrared landing lights include glass infrared filters placed in front of standard landing light fixtures. Two major problems exist with these known infrared landing lights. First, the known infrared landing lights "leak" light while in operation, allowing the aircraft to be seen by viewers in the vicinity. Second, the heat generated within the glass infrared filters causes the filters to crack and break. When this happens, the landing lights produce substantial amounts of visible light that render the pilots' night vision devices inoperable. Not only are the pilots temporarily blinded, but the substantial amounts of visible light produced allow the aircraft to be easily spotted by unaided viewers in the vicinity.

It would be beneficial to have an infrared landing light that produces very little visible light, thereby providing a high level of covertness, and is durable and dependable.

SUMMARY OF THE INVENTION

An infrared landing light is disclosed including a housing adapted for mounting in an aircraft, a lamp positioned within the housing and adapted to produce light having an infrared portion, and a louver positioned and adapted to receive the light and to substantially absorb a fraction of the light not directed in a forward direction.

Other features and advantages of the present invention will become apparent from the following more detailed description, taken in conjunction with the accompanying drawings, which illustrate, by way of example, the principles of the invention.

BRIEF DESCRIPTION OF THE DRAWING

The accompanying drawings illustrate the present invention. In such drawings.

DETAILED DESCRIPTION OF THE INVENTION

Figure 1:
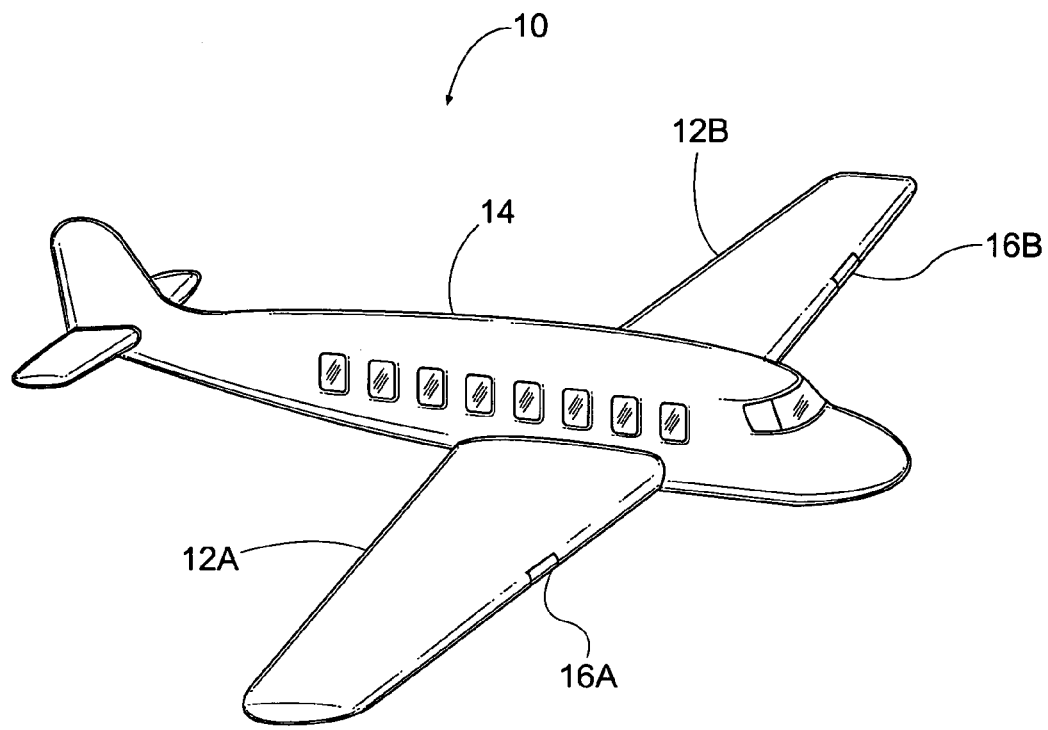
FIG. 1 is a perspective view of one embodiment of an airplane including a pair of wings extending outwardly from opposite sides of a fuselage, wherein a light module is mounted in a leading edge of each of the wings.

An infrared landing light 18 (FIGS. 1, 3, and 4) is disclosed including a housing 26 (FIG. 3) adapted for mounting in an aircraft 14 (FIG. 1), a lamp 32 (FIG. 4) positioned within the housing 26 and adapted to produce light having an infrared portion, and a louver 60 (FIG. 6) adapted to receive the light and to substantially absorb a fraction of the light not directed in a forward direction. The louver 60 is preferably part of a lens/louver assembly 36, shown in FIG. 6, that includes an infrared filter for blocking any portion of the light that is not infrared. The infrared filter preferably includes a plurality of infrared filters 80, as described in greater detail below. While specific embodiments of this construction are provided below, the scope of the invention should not be limited to any of these particular embodiments, but should be interpreted only in light of the claims provided below.

FIG. 1 is a perspective view of one embodiment of an airplane 10 including a pair of wings 12A and 12B extending outwardly from opposite sides of a fuselage 14. A first light module 16A is preferably mounted in a leading edge of the wing 12A, and a second light module 16B is preferably mounted in a leading edge of the wing 12B.

Figure 2:
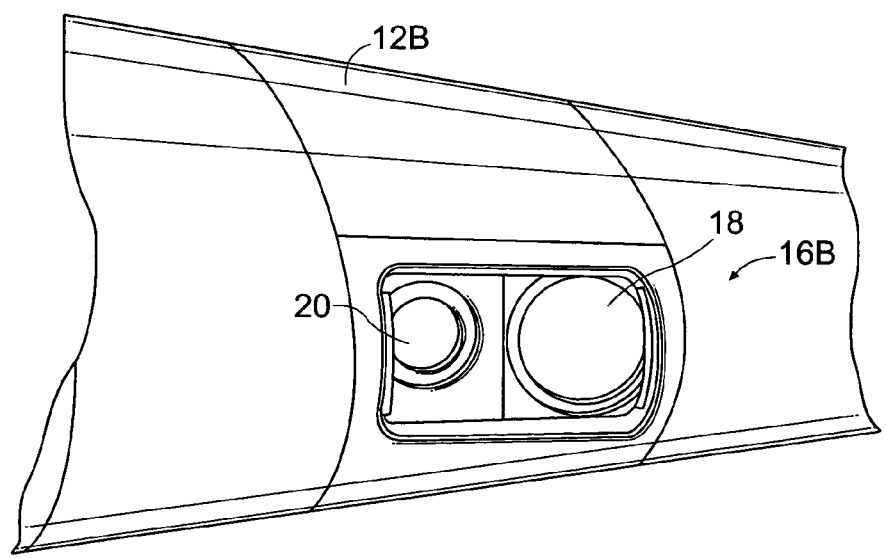
FIG. 2 is a front elevation view of one of the wings of FIG. 1 illustrating the light module mounted in the leading edge, wherein the light module includes an infrared landing light and a taxi light.

FIG. 2 is a front elevation view of the wing 12B of FIG. 1 illustrating the light module 16B mounted in the leading edge. In the embodiment of FIG. 2, the light module 16B includes an infrared landing light 18 and a taxi light 20. The taxi light 20 may or may not be an infrared light. The light module 16A, mounted in the leading edge of the wing 12A of FIG. 1, is preferably similar to the light module 16B of FIG. 2. Other embodiments of the light modules 16A and 16B are possible and contemplated.

Figure 3:
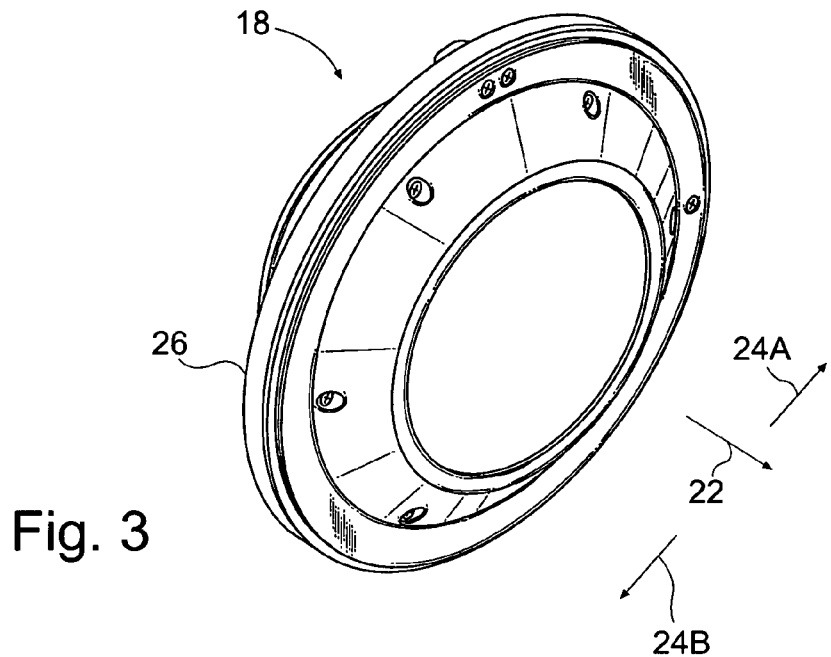
FIG. 3 is a perspective view of the infrared landing light of FIG. 2.

FIG. 3 is a perspective view of the infrared landing light 18 of FIG. 2. In general, the infrared landing light 18 produces a relatively narrow beam of substantially infrared light having a relatively high intensity in a forward direction 22 and relatively low intensities in lateral directions 24A and 24B.

In the embodiment of FIG. 3, the infrared landing light 18 includes a housing 26 formed from one or more substantially rigid, heat resistant materials. As described in more detail below, the housing 26 has mounting provisions for a standard landing light fixture. These standard mounting provisions advantageously allow the infrared landing light 18 to be mounted as a direct replacement for a standard landing light fixture.

As the infrared illumination produced by the infrared landing light 18 cannot be seen without external viewing aids such as night vision devices (e.g., night vision goggles), the infrared landing light 18 may be advantageously used to accomplish covert aircraft landings and takeoffs at night. When used at night, and when the pilots of the airplane 10 of FIG. 1 are wearing night vision devices, the infrared landing light 18 provides the proper illuminated area and distance required for landings and takeoffs of the airplane 10. The infrared landing light 18 produces very little visible light, thereby providing a high level of covertness, and is durable and dependable.

Figure 4:
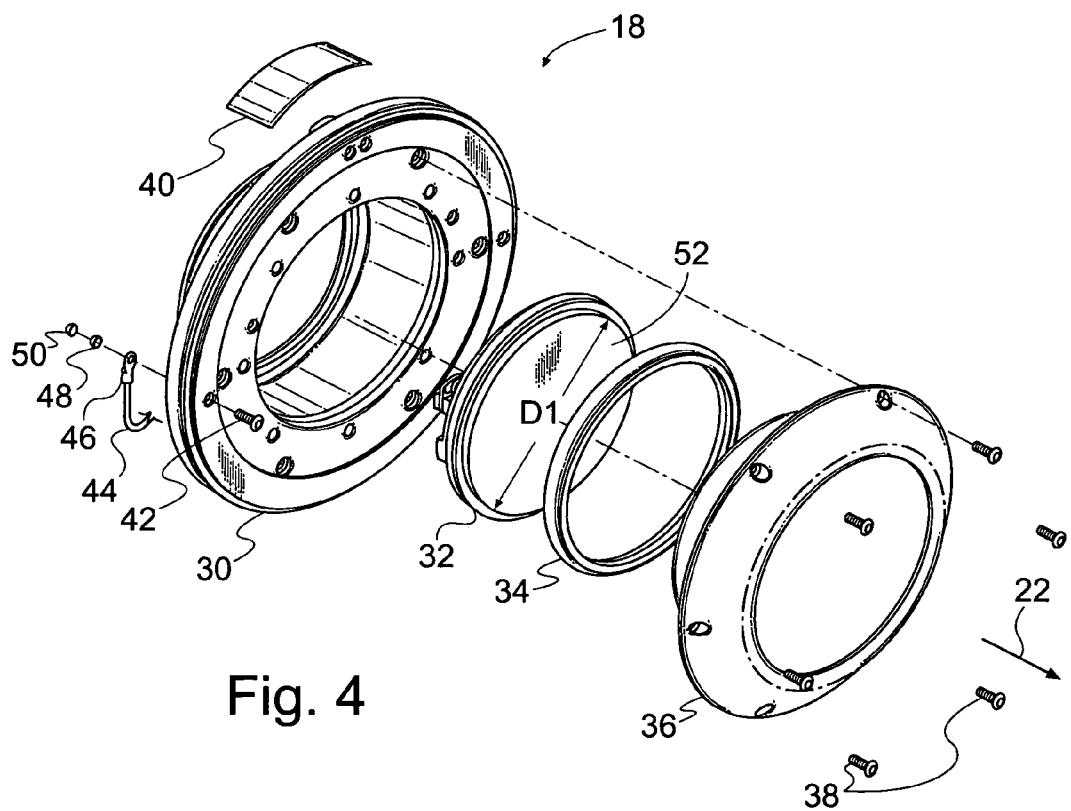
FIG. 4 is an exploded perspective view of the infrared landing light of FIG. 3, wherein the infrared landing light includes a cover assembly, a lamp, a lamp gasket, and a louver/filter retainer assembly.
Figure 9:
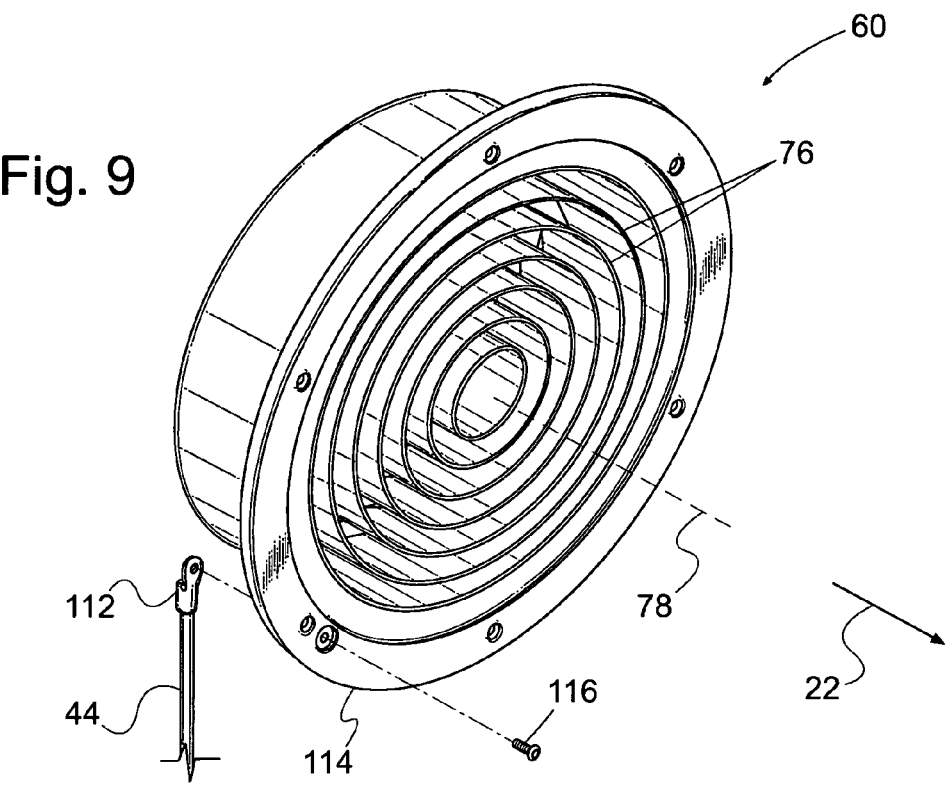
FIG. 9 is an exploded perspective view of the louver ring assembly of FIG. 6.

FIG. 4 is an exploded perspective view of the infrared landing light 18 of FIG. 3. In the embodiment of FIG. 4, the infrared landing light 18 includes a cover assembly 30, a lamp 32, a lamp gasket 34, and a louver/filter retainer assembly 36. The louver/filter retainer assembly 36 has multiple holes distributed about an outer surface. As shown in FIG. 9 and described below, the cover assembly 30 has corresponding holes with clinch nuts mounted therein. Multiple cover screws 38 are used to attach the louver/filter retainer assembly 36 to the cover assembly 30. A name plate 40 is attached to an exterior surface of a rear portion of the cover assembly 30. A tether screw 42, a lock washer 48, and a lock nut 50 are used to attach a small ring terminal 46 of a tether assembly 44 to the cover assembly 30.

In general, the lamp 32 produces both visible light and infrared light. As defined herein, visible light has wavelengths between about 380 nanometers (nm) and approximately 740 nm, and infrared light has wavelengths between about 740 nm and approximately 1 millimeter (mm). Thus the lamp 32 produces light having wavelengths between about 380 nm and approximately 1 mm.

In a preferred embodiment, the lamp 32 produces a beam of light having a relatively high intensity in the forward direction 22. The lamp 32 is preferably a sealed beam lamp including a light source (e.g., a filament) adapted to produce light and a reflector to reflect a portion of the light, thereby producing the beam of light. The sealed beam lamp is preferably an incandescent parabolic aluminized reflector (PAR) lamp. Alternately, the lamp 32 may be a halogen lamp.

In the embodiment of FIG. 4, the lamp 32 includes a lens 52 forming a front portion of the lamp 32. The lens 52 may be round and has a diameter "D1". In one embodiment the lamp 32 is a PAR lamp, and the lens 52 has a diameter of about 8 inches.

The lamp gasket 34 is installed around the lamp 32 to provide cushioning for the lamp 32. In one embodiment, the lamp gasket 34 is molded from silicone rubber. In general, the lamp gasket 34 may be manufactured from any heat tolerant and cushioning material. The lamp gasket 34 may be a single piece gasket or a multiple piece gasket.

Figure 5:
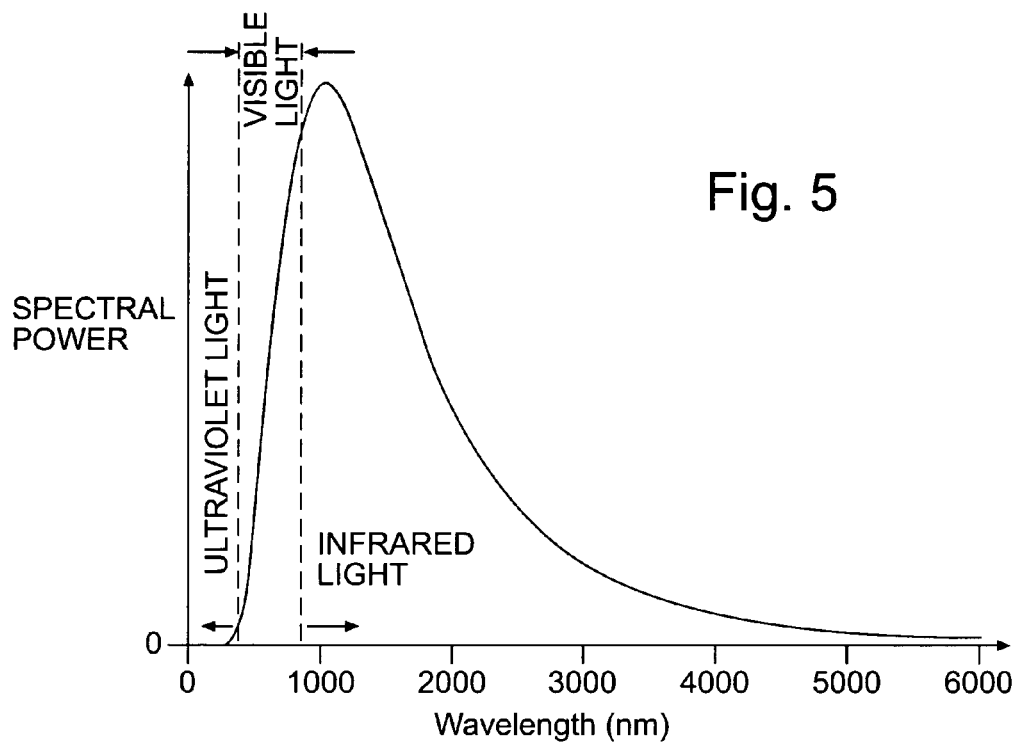
FIG. 5 is a graph of the spectral power produced by the lamp of FIG. 4 versus wavelength wherein the lamp is an incandescent parabolic aluminized reflector (PAR) lamp.

FIG. 5 is a graph of the spectral power produced by the lamp 32 of FIG. 4 versus wavelength wherein the lamp 32 is an incandescent PAR lamp. As indicated in FIG. 5, the incandescent PAR lamp 32 produces visible light, infrared light, and ultraviolet light. An infrared portion of the spectral power of the light produced by the lamp 32 is several times greater than a visible portion. It is estimated that the incandescent PAR lamp 32 produces about 7 times more light energy as infrared light than as visible light.

While the preferred embodiment of the present invention includes a lamp 32 that is an incandescent PAR type lamp, and also includes a filter element, described below, to filter out visible light, in another embodiment the lamp 32 could include a plurality of IR LEDs (not shown), and this embodiment would not require a filter element. Such an embodiment is shown in Martin et al., U.S. Pat. No. 6,559, 777 B1, which is hereby incorporated by reference in its entirety.

Figure 6:
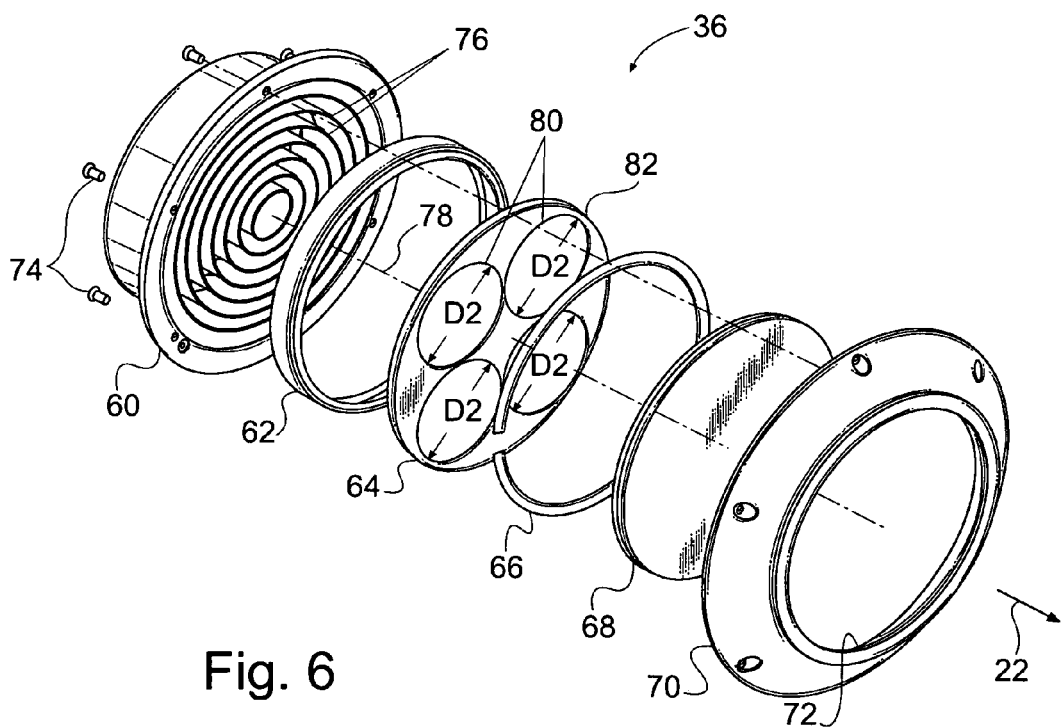
FIG. 6 is an exploded perspective view of the louver/filter retainer assembly of FIG. 4, wherein the louver/filter retainer assembly includes a louver ring assembly, a first lens gasket, an infrared filter assembly, a second lens gasket, a red lens, and a retainer.

FIG. 6 is an exploded perspective view of the louver/filter retainer assembly 36 of FIG. 4. In this embodiment, the louver/filter retainer assembly 36 includes a louver ring assembly 60, a first lens gasket 62, an infrared filter assembly 64, a second lens gasket 66, a red lens 68, and a retainer 70. A central hole in the retainer 70 is dimensioned to receive the red lens 68. An outer surface of the red lens 68 may be attached to an inner surface 72 of the central hole via a bead of a clear adhesive. Louver screws 74 are used to attach the retainer 70 to the louver ring assembly 60. During installation, the louver screws 74 may be coated with a thread lock material.

In general, the louver ring assembly 60 receives the light produced by the lamp 32 of FIG. 4 and absorbs a fraction of the light not directed in the forward direction 22. In the embodiment of FIG. 6, the louver ring assembly 60 includes multiples concentric rings 76 that are formed from sidewalls having a common axis 78, wherein the axis 78 is oriented in the forward direction 22.

In one embodiment, the louver ring assembly 60 is machined from a solid bar of 6061 aluminum alloy. In general, the louver ring assembly 60 may be made (e.g., cast) of any other heat tolerant material. Suitable metals include aluminum and steel, among others. The louver ring assembly 60 includes a flange 84 at a front surface for attaching to the retainer 70. The flange 60 extends perpendicularly outward from the sidewalls of the rings 76.

In general, the multiple concentric rings 76 function as baffles to control beam spread. While the sidewalls may be formed in rings 76 as shown in the present the louver ring assembly 60, other shapes may also be utilized, as long as the sidewalls are oriented along the common axis 78 in the forward direction 22.

The concentric rings 76 are preferably coated with a substance that substantially absorbs incident light. In one embodiment, the concentric rings 76 are coated with a high temperature black paint that substantially absorbs incident light.

In the embodiment of FIG. 6, the infrared filter assembly 64 includes a plurality of infrared filters 80 (in this embodiment, four filters) mounted in corresponding openings in a lens retainer 82. The lens retainer 82 is preferably constructed of a strong, heat resistant material such as aluminum, and is approximately 4.75 inches in diameter (although this may vary depending upon the specific embodiment). The infrared filter assembly 64 receives the light produced by the lamp 32 of FIG. 4 and exiting the louver ring assembly 60, and substantially passes the infrared portion of the light while substantially blocking the visible portion of the light. Each of the infrared filters 80 is substantially transparent to the infrared light and substantially opaque to the visible light.

Each of the infrared filters 80 substantially blocks received visible light by absorption, converting the energy of absorbed visible light into heat energy. The thermally conductive lens retainer 82 conducts the heat energy away from the infrared filters 80. As a result, the infrared filter assembly 64 provides high levels of covertness, stability, and durability.

In general, the infrared filters 80 can be made from any material that substantially transmits infrared light and substantially blocks visible light. As described above, visible light has wavelengths between about 380 nm and approximately 740 nm, and infrared light has wavelengths between about 740 nm and approximately 1 mm. Thus in general the infrared filters 80 can be made from any material that substantially transmits infrared light having wavelengths between about 740 nm and approximately 1 mm, and substantially blocks visible light having wavelengths between about 380 nm and approximately 740 nm.

In one embodiment, the infrared filters 80 are formed from tempered RG 830 color filter glass having a thickness of about 3.5 mm. Color filter glasses are identified by their selective absorptions of light. Wavelength ranges are specified by two-letter prefix codes. The code "RG" specifies "red and black glass, infrared transmitting." The prefix codes are followed by numeric designations which further specify the wavelengths. The numeric designation "830" following the prefix code "RG" specifies a 50 percent transmission wavelength. RG 830 filter glass transmits about 50 percent of incident light having a wavelength of about 830 nm, substantially transmits infrared light having wavelengths greater than about 830 nm, and substantially blocks light having wavelengths less than approximately 810 nm.

In general, each of the infrared filters 80 of FIG. 6 has a major dimension "D2." In the embodiment of FIG. 6, each of the infrared filters 80 is round the major dimension D2 is a diameter. It is noted, however, that the infrared filters 80 need not be round. In other embodiments the infrared filters 80 may be, for example, pie shaped.

Referring back to FIG. 4, the lens 52 forming the front portion of the lamp 32 is round and has the diameter D1 as shown in FIG. 4 and described above. Referring to FIGS. 4 and 6, in one embodiment, the lamp 32 (FIG. 4) is a PAR lamp with a lens 52 having a diameter of about 8 inches. Each of the infrared filters 80 (FIG. 6) is preferably less than 2.6 inches in diameter s D2, and is most preferably approximately 1.8 inches in diameter D2 (by approximately we mean +/−0.2 inches). As noted above, however, the infrared filters 80 need not be round. In general, in some embodiments, a front portion of the lamp 32 (FIG. 4) is round and has a diameter D1, and each of the infrared filters 80 (FIG. 6) has a major dimension D2 that does not exceed half the diameter of the front portion of the lamp.

It is important that the major dimension D2 of the infrared filters 80 (FIG. 6) be less than 2.6 inches because larger filters tend to crack in the heat of the lamp 32. By providing a plurality of smaller filters, a larger dimension can be covered without the cracking issues. Referring to FIG. 6, the lens retainer 82 may, in general, be formed from any substantially rigid, heat conductive material. For example, the lens retainer 82 may be machined or cast from aluminum or steel. The material of the lens retainer 82 preferably expands at a substantially constant rate when the temperature of the lens retainer 82 is increased abruptly. In general, the lens retainer 82 may have any geometric shape that produces the required light output and fits within the cavity provided in the retainer 70. The openings in the lens retainer 82 for the infrared filters 80 preferably correspond to the geometric shapes of the infrared filters 80.

The red lens 68 receives the light produced by the lamp 32 of FIG. 4 and exiting the infrared filter assembly 64. In the embodiment of FIG. 6, the red lens 68 substantially passes the infrared light while substantially blocking all but a red portion of the visible light. As described above, infrared light has wavelengths between about 740 nm and approximately 1 mm. The red portion of visible light has wavelengths between about 625 nm and approximately 740 nm. Thus in the embodiment of FIG. 6, the red lens 68 substantially passes light having wavelengths between about 740 nm and approximately 1 mm while substantially blocking light having wavelengths below about 625 nm.

In general, the red lens 68 functions to protect the infrared filter assembly 64, and in other embodiments the red lens 13 may be clear. In the embodiment of FIG. 6, the red lens 68 is a single molded piece of red glass. In general, the red lens 68 can be made from any heat and impact tolerant material with desired optical properties such as borosilicate glass.

The red lens 68 can be cast, molded, or cut from a sheet from sheet stock. When cut from a sheet from sheet stock, the red lens 68 may be subsequently ground to achieve a desired shape. The thickness of the red lens 68 can be varied to achieve a desired level of impact resistance. The red lens 68 can be any geometric shape that produces a desired light output and pattern.

In one embodiment, the first lens gasket 62 is manufactured from silicone rubber sheet stock, and the second lens gasket 66 is molded from silicone rubber. In general, the first lens gasket 62 and the second lens gasket 66 may be formed from any heat tolerant and cushioning material. The first lens gasket 62 and the second lens gasket 66 can be single piece gaskets or multiple piece gaskets. Air venting can be provided by one or more slot or bands in the gasket.

Figure 7:
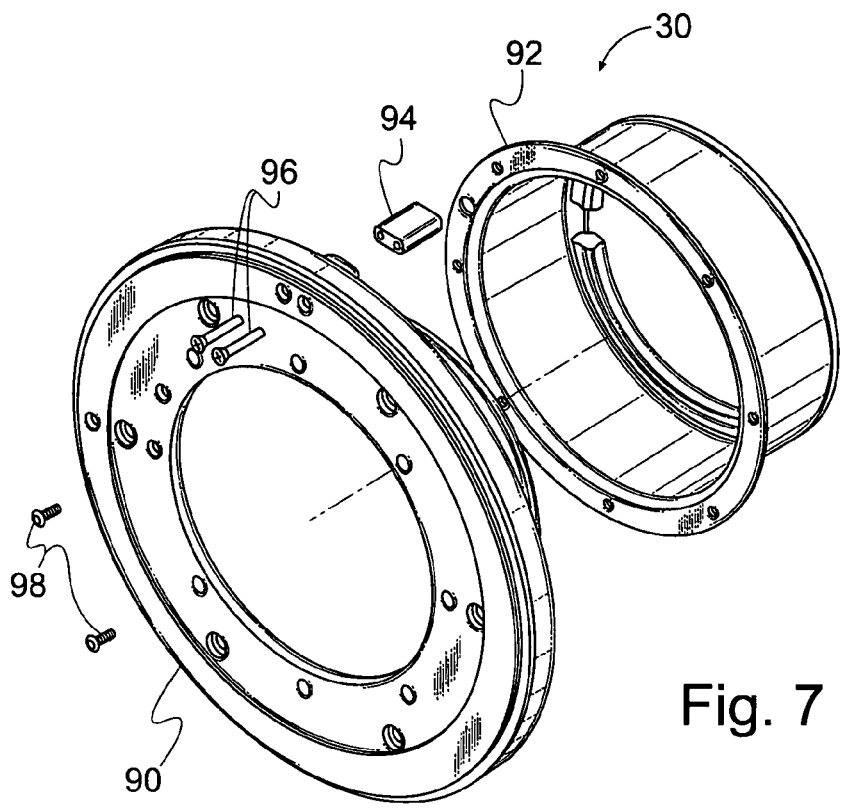
FIG. 7 is an exploded perspective view of the cover assembly of FIG. 4, wherein the cover assembly includes a cover subassembly and a lamp cover assembly.

FIG. 7 is an exploded perspective view of the cover assembly 30 of FIG. 4. In the embodiment of FIG. 7, the cover assembly 30 includes a cover subassembly 90 and a lamp cover assembly 92. An indexer 94 is attached to a back side of the cover subassembly 90 by a pair of indexer screws 96. Multiple rivets 98 are used to attach the lamp cover assembly 92 to the cover subassembly 90.

In one embodiment, the indexer 94 is machine from a bar of 6061 aluminum alloy. In general, the indexer may be formed from any heat tolerant and rigid material. Suitable metals include aluminum and steel. The indexer 94 can be mounted via multiple fasteners As shown in FIG. 7, or can be attached using an adhesive material. Alternately, the indexer 94 may be an integral part of the lamp cover assembly 92.

Figure 8:
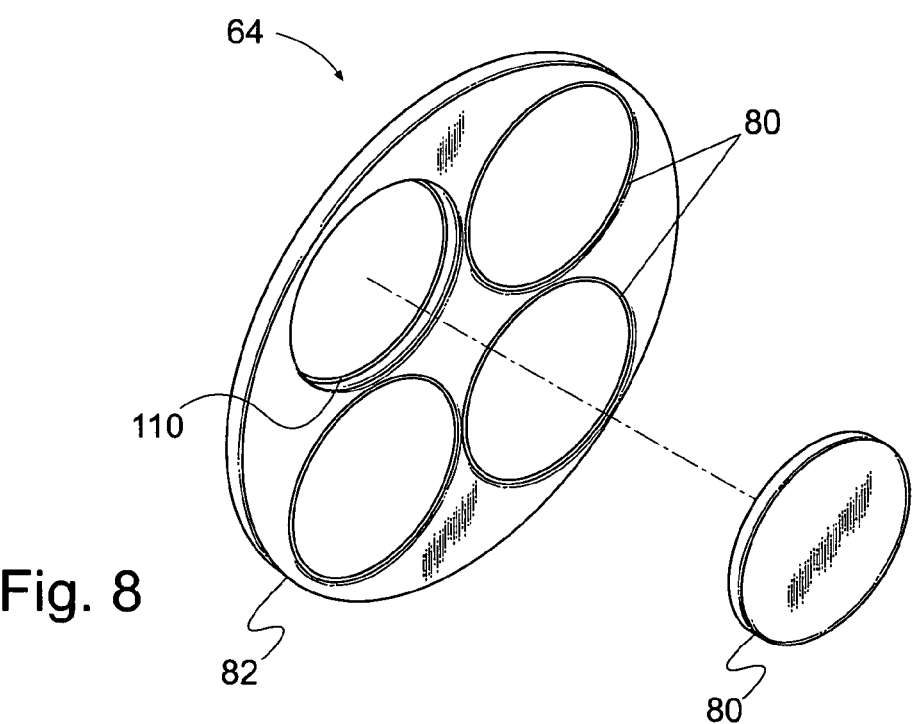
FIG. 8 is a perspective view of the infrared filter assembly of FIG. 6.

FIG. 8 is a perspective view of the infrared filter assembly 64 of FIG. 6. As described above, the infrared filter assembly 64 includes the four infrared filters 80 mounted within the lens retainer 82. The lens retainer 82 has four openings dimensioned to receive the four infrared filters 80, and each of the four infrared filters 80 fits into a corresponding one of the openings in the lens retainer 82. A layer of an adhesive (e.g., a red adhesive) may be applied to a side wall 110 of each of the openings in the lens retainer 82, and used to mount the corresponding infrared filter 80 within the opening.

FIG. 9 is an exploded perspective view of the louver ring assembly 60 of FIG. 6. As described above, the louver ring assembly 60 includes multiples concentric rings 76 having a common axis 78, wherein the axis 78 is oriented in the forward direction 22. In the embodiment of FIG. 9, a large ring terminal 112 of the tether assembly 44 (see FIG. 4) is attached to an outer flange 114 of the louver ring assembly 60 via an eyelet 116.

Figure 10:
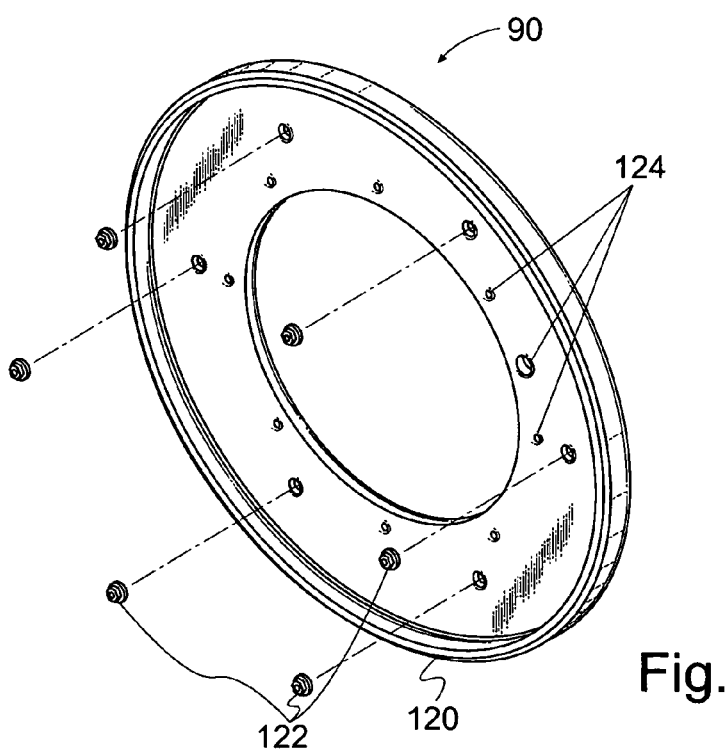
FIG. 10 is an exploded perspective view of the cover subassembly of FIG. 7.

FIG. 10 is an exploded perspective view of the cover subassembly 90 of FIG. 7. In the embodiment of FIG. 10, the cover subassembly 90 includes a cover 120 having multiple holes passing there through. Multiple clinch nuts 122 are mounted within the holes such that each of the clinch nuts 122 is mounted in a different one of the holes. Each of the clinch nuts 122 receives a different one of the cover screws 38 of FIG. 4.

In one embodiment, the cover 120 is machined from 6061 aluminum alloy. In general, the cover 120 may be formed (e.g., cast) from any rigid, heat resistant material. Suitable metals include aluminum and steel.

In the embodiment of FIG. 10, the cover 120 includes several holes 124 sized and arranged to form standard mounting provisions for a standard landing light fixture. These standard mounting provisions advantageously allow the infrared landing light 18 of FIG. 3 to mount as a direct replacement for a standard landing light fixture.

Figure 11:
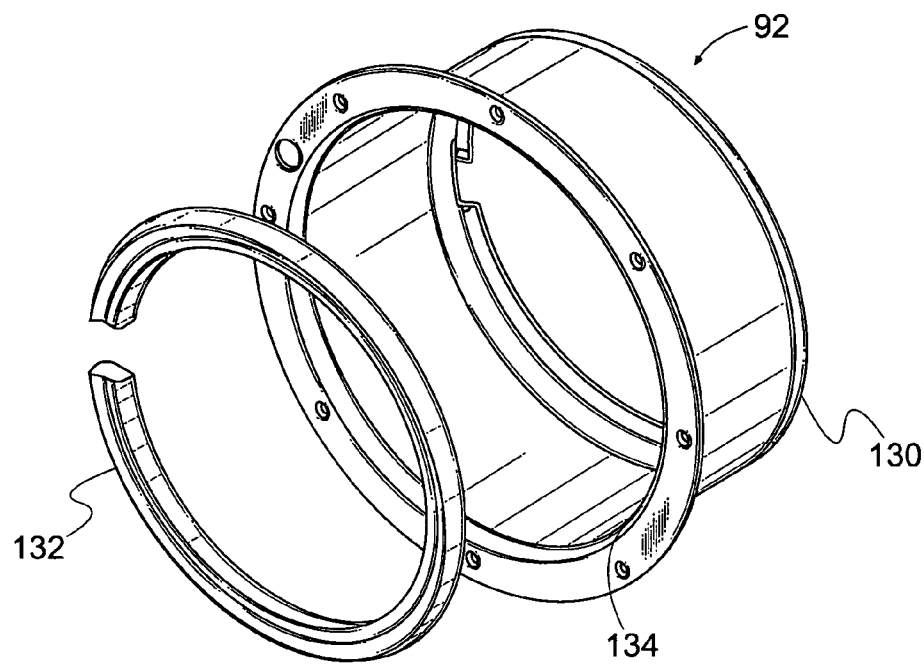
FIG. 11 is an exploded perspective view of the lamp cover assembly of FIG. 7.

FIG. 11 is an exploded perspective view of the lamp cover assembly 92 of FIG. 7. In the embodiment of FIG. 11, the lamp over assembly 92 includes a lamp holder 130 and a sponge gasket 132. The lamp over 130 has a recess in one side, and the sponge gasket 132 is mounted within the recess (e.g., via a layer of red adhesive). In one embodiment, the lamp holder 130 is formed from 6061 aluminum alloy sheet stock. In general, the lamp holder 130 may be formed (e.g., cast) from any rigid, heat resistant material. Suitable metals include aluminum and steel. In one embodiment, the sponge gasket 132 is formed from an adhesive-backed sponge rubber material. In general, the sponge gasket 132 can be manufactured from any other heat tolerant and cushioning material, and need not include an adhesive backing. The sponge gasket 132 can be a single piece gasket or a multiple piece gasket.

Figure 12:
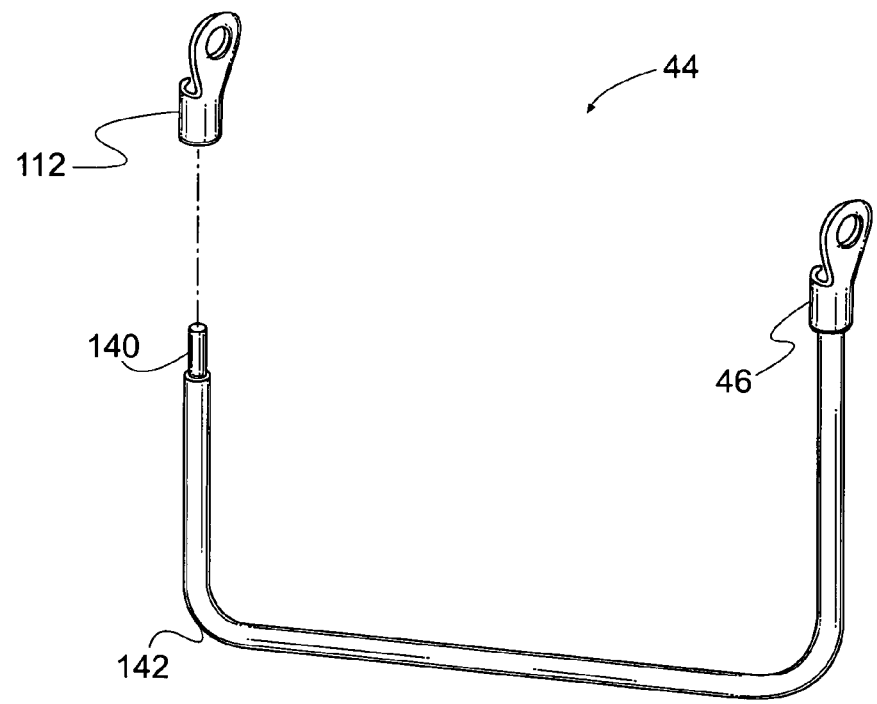
FIG. 12 is an exploded perspective view of the tether assembly of FIG. 4.

FIG. 12 is a exploded perspective view of the tether assembly 44 of FIG. 4. In the embodiment of FIG. 12, the tether assembly 44 includes the small ring terminal 46 of FIG. 4 and the large ring terminal 112 of FIG. 9 attached to opposite ends of a cable 140. A shrink sleeve 142 is positioned over an outer surface of the cable 140 between the small ring terminal 46 and the large ring terminal 112.

While the invention has been described with reference to at least one preferred embodiment, it is to be clearly understood by those skilled in the art that the invention is not limited thereto. Rather, the scope of the invention is to be interpreted only in conjunction with the appended claims.

What is claimed is:

1. An infrared landing light for an aircraft, the infrared landing light comprising:
    a housing adapted for mounting in the aircraft;
    a lamp positioned within the housing and adapted to produce light having an infrared portion and a visible portion;
    a louver adapted to receive the light from the lamp and to substantially absorb a fraction of the light not directed in a forward direction; and
    an infrared filter adapted to receive the light and to substantially pass the infrared portion while substantially blocking the visible portion, wherein the infrared filter comprises a plurality of infrared filters mounted within a thermally conductive lens retainer.

2. The infrared landing light as recited in claim 1, wherein each of the plurality of infrared filters converts energy of received visible light into heat energy, and wherein the lens retainer conducts the heat energy away from the plurality of infrared filters.

3. The infrared landing light as recited in claim 2, wherein the lamp has a front portion that is round and has a diameter, and wherein each of the plurality of infrared filters has a major dimension that does not exceed half the diameter of the front portion of the lamp.

4. The infrared landing light as recited in claim 1, wherein the louver is positioned adjacent to the lamp and between the infrared filter and the lamp.

5. The infrared landing light as recited in claim 1, further comprising:
    a red lens adapted to receive the light and to substantially pass the infrared portion while substantially blocking all but a red portion of the visible portion.

6. The infrared landing light as recited in claim 5, wherein the infrared filter is positioned adjacent to the louver and between the red lens and the louver.

7. The infrared landing light as recited in claim 1, wherein the infrared landing light produces a relatively narrow beam of substantially infrared light having a relatively high intensity in the forward direction and a relatively low intensity in a lateral direction.

8. An infrared landing light for use in an aircraft, comprising:
    a lamp adapted to produce a beam of light having a relatively high intensity in a forward direction, wherein the beam of light comprises visible light and infrared light;
    a louver ring assembly comprising a plurality of concentric rings and adapted to receive the beam of light, and to substantially absorb a portion of the light within the beam of light not directed in the forward direction; and
    an infrared filter assembly comprising a plurality of infrared filters mounted within a thermally conductive lens retainer, wherein the infrared filter assembly is adapted to receive the beam of light, and wherein each of the infrared filters is substantially transparent to the infrared light and substantially opaque to the visible light.

9. The infrared landing light as recited in claim 8, wherein the concentric rings of the louver ring assembly have a common axis, and wherein the axis is oriented in the forward direction.

10. The infrared landing light as recited in claim 8, wherein the concentric rings are coated with a substance that substantially absorbs incident light.

11. An infrared landing light for an aircraft, the infrared landing light comprising:
- a housing adapted for mounting in the aircraft;
- a lamp positioned within the housing and adapted to produce light having an infrared portion and a visible portion;
- a louver adapted to receive the light from the lamp and to substantially absorb a fraction of the light not directed in a forward direction; and
- an infrared filter adapted to receive the light and to substantially pass the infrared portion while substantially blocking the visible portion,
- wherein the louver is positioned adjacent to the lamp and between the infrared filter and the lamp.

* * * * *